Jan. 24, 1967 W. J. HOWARD 3,300,259

SHAFT BUSHINGS

Original Filed Oct. 31, 1963

INVENTOR

WILLIAM J. HOWARD

BY Aubrey D. McFadyen

ATTORNEY

United States Patent Office 3,300,259
Patented Jan. 24, 1967

3,300,259
SHAFT BUSHINGS
William J. Howard, P.O. Box 573,
Wilson, N.C. 27893
Continuation of application Ser. No. 320,367, Oct. 31,
1963. This application Oct. 20, 1965, Ser. No. 502,771
2 Claims. (Cl. 308—121)

This application is a continuation of application Serial No. 320,367, filed October 31, 1963, for Shaft Bushings now abandoned.

The present invention pertains to bearings or bushings for rotary shafts, and more particularly to problems of lubrication of such bushings. While the present invention has wide application, its use in the form of a molded plastic bushing for the brake cam shaft of motor trucks and trailers is disclosed as illustrative.

Bushings made of plastics, such as nylon, Teflon and the like, have been quite satisfactory as bearings for rotary and oscillatory shafts in many mechanisms. Bushings of this type were adopted for use as bearings for brake cam shafts or brake operating shafts of trucks and trailers and initially proved equally as efficient as the far more expensive brass or bronze bushings in general use.

But prolonged use resulted in serious difficulties in the brake mechanisms. After one of these bushings was in use for some time, it was often found that it would "freeze" on the shaft, resisting or even preventing operation of the brakes. Sometimes a bushing became so fixed on the shaft that it would be necessary to cut it off to replace it with a new bushing. This problem involved more than the cost of the bushing; the failure of the bushing might mean failure of the brakes. No one understood the reasons for failure of the bearings. No one was able to make a satisfactory bearing as a cam shaft bushing which was acceptable to the industry.

At this point, applicant became interested in manufacturing nylon bushings and made an investigation of the causes of the failures of so many plastic bearings used for this purpose. He found that the nylon bushings would "freeze" on the shaft because of corrosion and deduced that this corrosion resulted from failure of grease to reach the bearing surfaces of the bushing and shaft. Further investigation suggested to him the probable causes. The shaft would bear against the side of the bushing in which the grease aperture was located opposite the grease fitting, held against the bushing by its weight or by force from the brake cams or mechanism and blocking the aperture in the bushing. Because of accessibility, it was not feasible to reposition the grease fitting. In other cases, the grease aperture in the bushing would not be properly aligned with the grease fitting aperture in the bearing bracket, so grease would not reach the aperture in the bushing. In either case, the grease failed to reach the shaft.

These vehicles with their brake mechanisms might remain idle for a while, and were often exposed to wet weather so that moisture commonly accumulated on the brake members and bearings. In addition, nylon absorbs substantial moisture, which further contributed to corrosion of the shaft.

This discovery of the causes of the bearing failures led applicant to devise ways to overcome the difficulty. He formed the bushing with a channel leading from the grease aperture of the bracket to the opposite side of the bushing, and provided a second aperture through the bushing on that side. Since the bushing is always pressed in flush with the support bracket, the channel on the outer periphery of the bushing was always aligned with the grease fitting aperture in the support and grease could flow around the bushing to the aperture in the opposite side of the bushing. This solution effectively solved the problem. If, for any reason, the shaft was not spaced sufficiently from the bushing on the side opposite the grease fitting, a suitable space could be provided in the side of the bushing for the lubricant.

It is the primary object of the present invention, therefore, to provide a bushing of the kind aforementioned and for the environment alluded to in which the grease opening of the bushing requires no nicety of angular position within its support.

A further object of the present invention is to provide a bushing of the type alluded to having a recessed area provided on the inner face thereof and in communication with the grease fitting of the bushing support for admitting grease into contact with the shaft journaled therein.

A still further object of the present invention is to provide a cylindrical tubular bushing having a plurality of circumferentially spaced radial openings extending therethrough, with a circumferential groove formed in the exterior surface of the bushing and communicating with each of said openings.

A more particular object of the present invention is to provide a bushing of plastic to form a bearing for a brake operating shaft such as a brake cam shaft, with provision for flow of lubricant from a grease fitting aperture in the support for the bushing to a passage in the bushing leading to both sides of the inner bearing surface.

With the foregoing and other objects in view, as will appear as this specification progresses, the invention consists of the novel features of construction and the combination and arrangement of parts as will be hereinafter described and claimed.

In the accompanying drawings, in which similar reference characters designate like parts throughout the several views.

Figure 1:
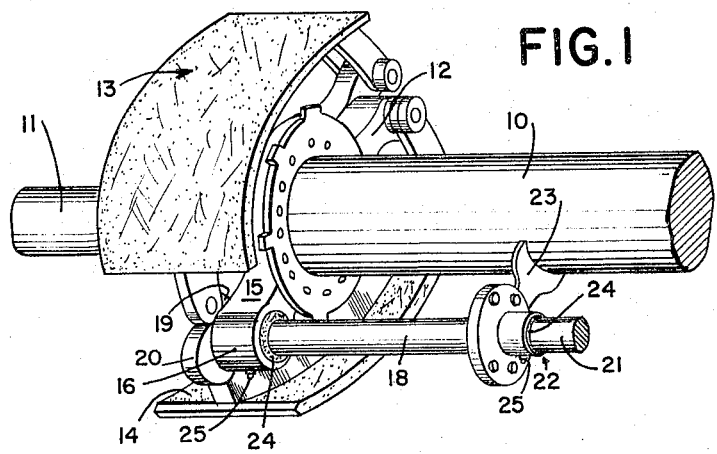
FIGURE 1 is a perspective detail of the basic elements comprising a conventional trailer truck brake system operated by a cam shaft, and depicting a special environment in which use of the present invention is envisaged.

In the typical motor truck installation of FIGURE 1, reference numeral 10 designates a non-rotatable axle, upon the reduced outer end 11 of which is normally mounted a wheel (not shown) having a brake drum. A brake spider 12 surrounds and is rigidly fixed to the axle and carries brake shoes 13, 14 for engaging the brake drum of said wheel. Spider 12 is formed with a radial extension or lug 15, which in turn terminates in a lobe 16 having a cylindrical bore 17 extending therethrough parallel with axle 10 for supporting the brake cam shaft 18. The cam shaft carries cams 19, 20 for spreading the brake shoes on partial rotation of the cam shaft. A lever arm (not shown) is connected to the cam shaft at a point to the right of broken away end 21 for rocking the latter for applying the brakes. A second bushing unit 22 for supporting the broken-off end 21 of shaft 18 is mounted on bracket 23, which bracket in turn is rigidly fixed to axle 10. Unit 22 conforms generally with the bushing arrangement provided on the spider. It should be understood that a structure corresponding to FIGURE 1 is duplicated for each end of each axle of the truck and trailer. Shaft 18 is about 20 inches long, and this shaft is subjected to considerable torque as indicated by the fact that it is on the order of 1½ inches in diameter.

Prior to the present invention it had been customary to incorporate a cylindrical bushing 24 within the bore of the lobe 16, as well as in unit 22, with a conventional Zerk grease fitting 25 communicating directly with a single opening 26 of the bushing, said opening being disposed, or attempted to be disposed in registry with the fitting. These bushings are press fitted into lobe 16 (and unit 22) and attaining registration of the single opening in the former bushings with the grease fitting has always posed problems. Also, since the lubricating operation is performed from beneath the truck axles, for ready accessibility, the fittings extend downwardly. It so happens that the brakes tend to bias shaft 18 downwardly, and the shaft thus tends to obstruct ingress of grease from the fitting 25 to the inner surface of the bushing. In the event that a bushing has suffered from insufficient or faulty lubrication and gripped shaft 18, the inlet opening 26 of former bushings may have been angularly displaced from registry with the fitting. The last mentioned situation generally ruins the bushing, and at best necessitates removal of shaft 18 in order to secure a new registry of the fitting and the single opening in prior type bushings.

Figure 2:
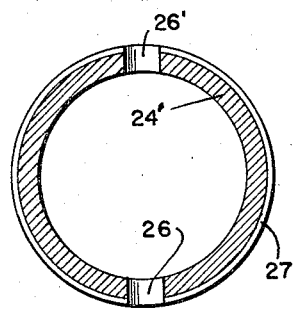
FIGURE 2 is a transverse cross-section taken through the center external groove of a bushing according to the present invention.
Figure 3:
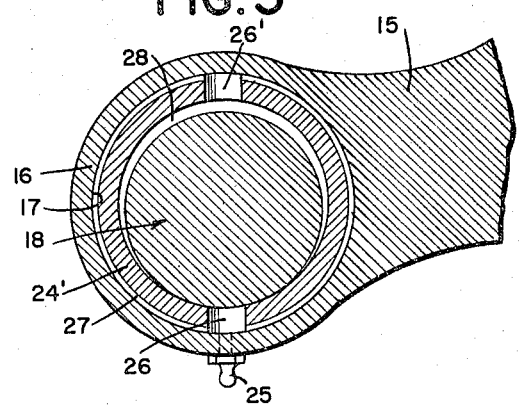
FIGURE 3 is a transverse section of a bushing of the present invention and a portion of its supporting spider of FIGURE 1, with the cam shaft shown therein.

The aforementioned difficulties and other shortcomings of prior bushings are obviated in the present invention. In the bushing 24' of the present invention, the single opening 26 of prior bushings has been supplemented by at least one additional opening 26' spaced from opening 26 circumferentially of the bushing. In FIGURES 2 and 3, the supplemental opening 26' is disposed diametrically to opening 26, where blockage of grease flow by shaft 18 is minimum. Next, the exterior surface of the bushing is formed with a circumferential groove 27 which intercepts each of the plurality of openings 26, 26'. When the present bushing is pressed into bore 17 of the lobe (or unit 22), the top of the groove is closed by the wall of the bore, thus defining a conduit for conveying lubricant from fitting 25 to the several openings 26, 26', regardless of the angular disposition of the openings relative to the fitting. Should the shaft block flow of lubricant through one opening, the lubricant will pass on to an unblocked opening, as will presently be explained.

The present invention further contemplates provision of at least one space area 28 between the cam shaft and the bushing for receiving and retaining lubricant. This grease receiving space may be provided in various ways. In FIGURE 2 it is provided by forming the bore of the bushing of slightly larger diameter than the cam shaft. Cam shaft 18 naturally will tend to rest primarily upon the lower half of the inner surface of the bushing, and the open space 28 will be at the top. At least one opening 26' will be located to lead directly to an open space 28. In practice, an excess internal diameter of the bushing on the order of .003 inch greater than the diameter of shaft 18 has served satisfactorily.

Another tact for providing a space area between the bushing and the shaft for receiving lubricant is to form the interior of the bushing with a shallow channel running lengthwise thereof. This may be accomplished, for example, by forming a portion of the inner wall of the bushing with a curvature of greater radius than the general curvature of the bushing, as shown at 29 in FIGURE 4. As here shown, the inner surface of the lower half of the bushing, which surface bears the normally downward thrust of shaft 10, is approximately semi-cylindrical to correspond with the curvature of said shaft; while the curvature of the inner surface of the upper half of the bushing is of greater radius to provide the space 28 within the bushing for receiving lubricant.

Figure 4:
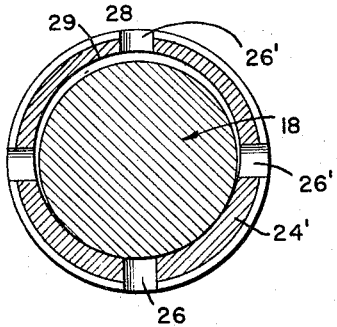
FIGURE 4 is a transverse section taken through the external circumferential groove of a modified form of my bushing and a shaft journaled therein.
Figure 5:
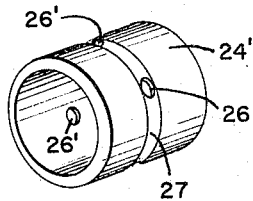
FIGURE 5 is a perspective of a bushing according to my invention having a plurality of spaced grease openings to be supplied from the grease fitting of the spider.

In the modification of FIGURE 4, in addition to the modification of the inner wall of the bushing to provide a space 28, there are four equally spaced openings 26, 26' shown formed in the bushing, thus assuring ample lubrication will reach the inner surface of the bushing under every condition likely to be encountered.

In installing the present bushing, it is merely necessary to press it endwise into the bore of lobe 17 (and unit 22) until the circumferential groove 27 communicates with the grease fitting 25. In practice, the bushing and the lobe, or other support, will be of approximately the same length, so it is simply necessary to bring the end of the bushing flush with the end of the lobe (or unit).

While the principles of the present invention are not restricted to use of particular materials, the facility, economy, and uniformity with which plastics, such as nylon, can be molded into the present invention dictates a preference for the latter material wherever use of bushings made thereof is feasible.

Although specific embodiments and applications of the present invention have been described herein and illustrated in the drawings, it is to be understood that the present invention embraces all such variations and changes in the form, proportions, and applications as fall within the purview of the appended claims.

What is claimed is:

1. In a brake operating mechanism having a brake cam shaft extending through a bore in a support which has a circumferentially continuous cylindrical inner surface and a grease aperture opening into said bore, a bushing of polymer plastic material press-fitted in said bore, said bushing having a circumferentially continuous cylindrical outer surface with a circumferential groove about the exterior periphery and a circumferentially continuous cylindrical inner surface and at least two openings in opposite sides of the bushing leading from said groove to the interior of the bushing, said groove being spaced substantially the same distance from one end of the bushing as the grease aperture is from the corresponding end of the bore in the support, so that when said bushing is pressed into said bore with its end substantially flush with the end of the bore, the groove will register with the grease aperture and will convey grease to said openings and grease will reach the interior of the bushing and the shaft therein through at least one opening if one of said openings is obstructed.

2. In a brake operating mechanism as defined in claim 1, in which the grease aperture is in the lower side of said support and the bushing has one of said openings in the upper side of said bushing and also a space between the shaft and the upper side of said bushing to receive grease, so that when the opening in the lower side of said bushing is obstructed, grease may be conveyed by said groove to the opening in the upper side and into said space.

References Cited by the Examiner

UNITED STATES PATENTS

| 2,566,080 | 8/1951 | Davids | 308—240 |
| 2,625,448 | 1/1953 | Underwood | 308—36.1 |
| 3,076,683 | 2/1963 | Hanley | 308—36.1 |
| 3,177,841 | 4/1965 | Galuska | 308—122 |

FOREIGN PATENTS

| 506,393 | 10/1954 | Canada. |
| 461,933 | 1/1914 | France. |
| 911,928 | 5/1954 | Germany. |

MARTIN P. SCHWADRON, *Primary Examiner.*

FRANK SUSKO, *Examiner.*